United States Patent [19]

Damson et al.

[11] Patent Number: 4,565,087

[45] Date of Patent: Jan. 21, 1986

[54] METHOD AND APPARATUS FOR RECOGNITION OF KNOCKING IN AN INTERNAL COMBUSTION ENGINE

[75] Inventors: Eckart Damson, Stuttgart; Martin Klenk, Backnang; Winfried Moser, Ludwigsburg; Heinz Möller, Stuttgart, all of Fed. Rep. of Germany

[73] Assignee: Robert Bosch GmbH, Stuttgart, Fed. Rep. of Germany

[21] Appl. No.: 613,152

[22] Filed: May 23, 1984

[30] Foreign Application Priority Data

May 28, 1983 [DE] Fed. Rep. of Germany ....... 3319458

[51] Int. Cl.[4] ............................................. G01L 23/22
[52] U.S. Cl. ...................................................... 73/35
[58] Field of Search ..................... 73/35; 123/416, 425, 123/435

[56] References Cited

U.S. PATENT DOCUMENTS

| | | | |
|---|---|---|---|
| 3,942,359 | 3/1976 | Arrigoni et al. | 73/35 |
| 4,133,475 | 1/1979 | Harned et al. | 73/35 |
| 4,153,020 | 5/1979 | King et al. | 73/35 |
| 4,418,567 | 12/1983 | Boning et al. | 73/35 |
| 4,492,108 | 1/1985 | van Zanten | 73/35 |

Primary Examiner—Stephen A. Kreitman
Attorney, Agent, or Firm—Frishauf, Holtz, Goodman & Woodward

[57] ABSTRACT

Engine knock sensor signals are amplified, band-pass filtered and rectified and then a sequence of integrated signal peak values are compared with reference signals relating to a typical engine knock signal. If the deviation of the integration values or peak values or their sum over a measurement period differs by less than a predetermined amount from the corresponding reference values, a knock indication is produced. The initial integration or peak value may be given less weight than those that follow. The knock sensor may be an engine block sound sensor, or a combustion chamber light, pressure or iron current sensor. Additional criteria, such as the interval between null transitions or signal maxima or the number of them in a measuring period may be used to inhibit a knock indication in case the main processing should occasionally provide an anomalous knock signal, but this precaution is not sufficiently needed to warrant its inclusion in simplified systems.

27 Claims, 6 Drawing Figures

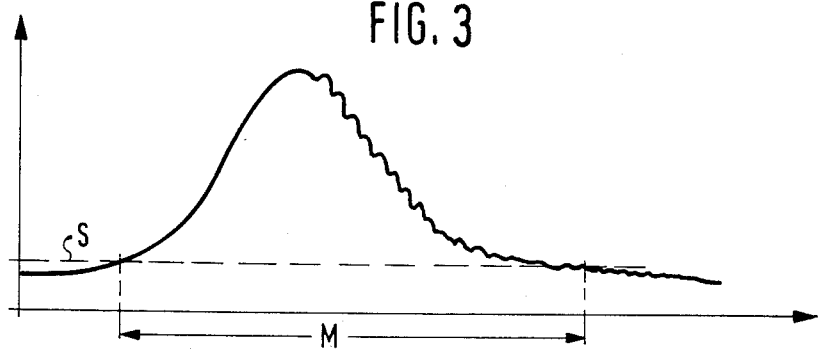
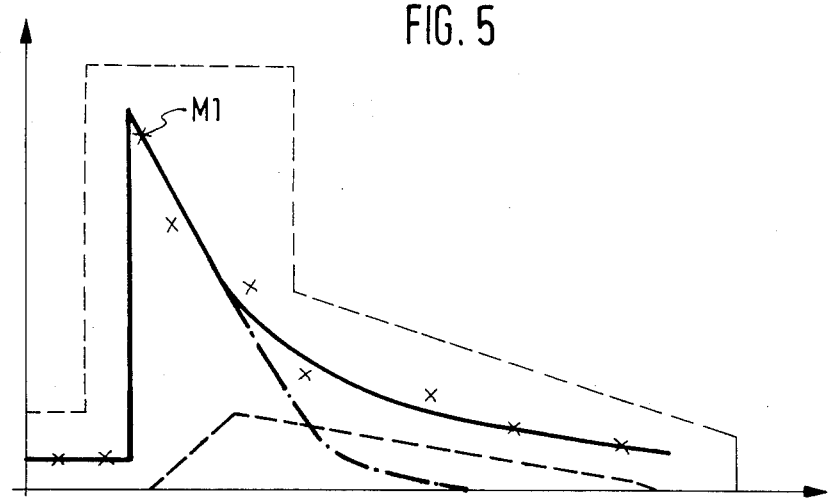
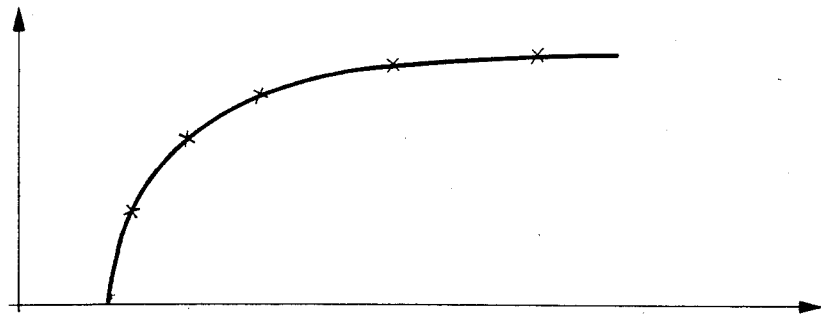

METHOD AND APPARATUS FOR RECOGNITION OF KNOCKING IN AN INTERNAL COMBUSTION ENGINE

This invention concerns engine knock recognition by means of a sensor provided on the engine block or in the combustion chamber of an engine cylinder which produces signals which are amplified and filtered and then compared with some criteria to determine whether the engine is knocking.

Such methods are known, for example, in U.S. Pat. No. 4,133,475 and pending U.S. patent application Ser. No. 410,629, now U.S. Pat. No. 4,478,068 filed Aug. 23, 1982, owned by the assignee of the present applcation. In those disclosures it is pointed out that knocking involves shock waves of the fuel-air mixture which are noticeable as audio frequency oscillations of the motor as well as by other effects. Since, as a rule, a strong thermal loading of the internal walls of the cylinder and the facing piston head takes place during knocking, with the result that material may be worn off these surfaces, efforts are made to eliminate knocking across the board, since during prolonged occurrence it can lead to damage or destruction of the engine. For that purpose knocking must be recognized soon and reliably, as the result of which the measurement technology problem arises to perceive or read out the knock signal from the oscillations and vibrations of the engine which are picked up by a sensor or transducer and to do this reliably and clear of interference.

This problem exists for any of a variety of sensors and sensor signals that may be used, for example, signals indicating the course of pressure, or light intensity or flame ionization in the cylinder combustion chamber or more generally, the noise in the engine block.

In the known systems an average background noise is compared with the vibrations and oscillations produced by the motor at the particular moment, with the integral of the electrical oscillations into which the mechanical movements are converted, being evaluated within a particular time window. Then in a limited frequency spectrum only the amplitude and sometimes the duration of the knock vibrations are used for recognition. When a reference value is exceeded it is deemed that knocking is taking place. In order to reach a somewhat more reliable knock recognition, it has been necessary up to now to go to great expense and complication in the processing and evaluation of the knock signal.

SUMMARY OF THE INVENTION

It is an object of the present invention to provide a method and an apparatus for recognizing engine knock by the use of a more sophisticated criterion for evaluation of the amplified and filtered sensor signals and to make this possible by means that are reliable and not unduly expensive.

Briefly, the sensor signals are compared with the typical course of an engine knock oscillation, namely the very rapid rise of the amplitude followed by the attenuation of the oscillation. More particularly, there are derived from the band filtered electrical signals of the sensor successive integrated signal values, respectively integrated during intervals between null transitions for peak values of the signal or successively obtained by a peak value detector. It is useful to rectify the signal before integration or peak value elicitation. The successive integration or peak values are then compared with a model curve defining corresponding typical or reference values for a knock signal or with a corresponding reference sequence of reference signals and the extent to which deviations from the curve or reference signals are found is then compared with a reference value of deviation to control the provision of an engine knock signal.

It is particularly useful to provide normalization for comparison purposes, based either on the magnitude of the first or highest integration or peak value result, applied either as a factor to the observed signal by control of the gain of an amplifier or applied as a factor to the reference values to be used in comparison. Still another refinement is to reduce the weight of the initial integration or peak value in the determination of the result. Either the deviation of individual integration of peak values from the reference values may be used as the knock criterion or the difference of the sum of these differences from a reference sum value, and it is also possible to utilize quadratic sums rather than linear sums, for example.

The advantages of the invention are that significant features of the knock oscillations are utilized that are generally left out of account in conventional systems using averages of signal values. The result is that a substantially unambiguous criterion for engine knock is made available. From an apparatus point of view it is advantageous to use a pair of integrators or peak value detectors so that one of them can be transferring its result to a microcomputer while the other is producing a current measurement value.

It is also possible to define a tolerance region around a typical engine knock curve and to recognize a signal as a knock signal when the successive integrations or peak values all lie within the tolerance region.

BRIEF DESCRIPTION OF THE DRAWINGS

Further details and features of the invention are described in the description that follows, in which the invention is further explained by way of illustrative example with reference to the annexed drawings, in which:

FIG. 3 is a graphical representation of the time-course of a signal of a knock sensor;

FIG. 5 is a graphical representation of the course of a sequence of function values obtained from a band-filtered signal by the operation of a circuit according to FIG. 1 or FIG. 2, together with a model or reference curve and boundary lines for significant deviations therefrom, and FIG. 6 is a diagram of a model or reference curve and corresponding progressively summed function values derived from sensor signal processing relating to that function curve.

DESCRIPTION OF THE ILLUSTRATED EMBODIMENTS

Figure 1:
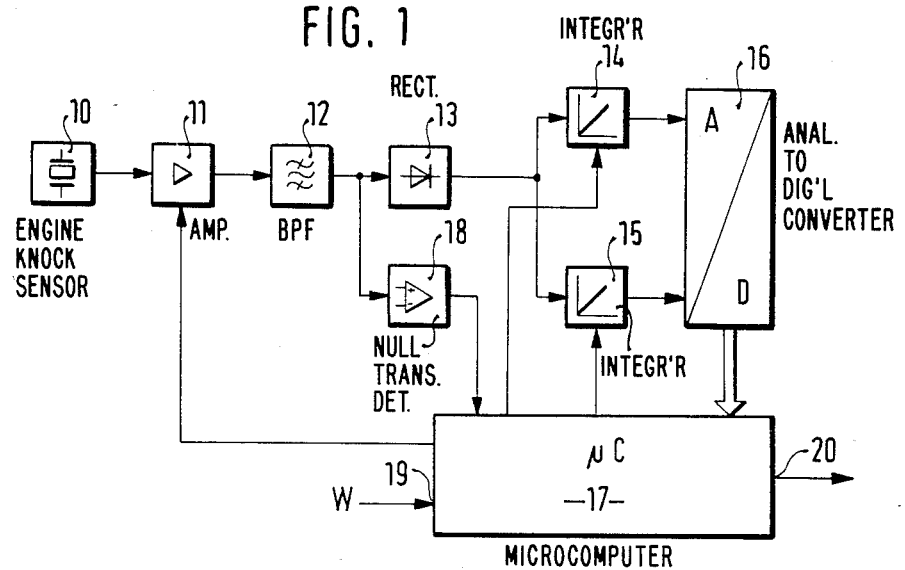
FIG. 1 is a circuit block diagram of a first embodiment of apparatus for the practice of the method of the invention.

In the first embodiment shown in FIG. 1, the signals of an engine knock sensor 10, which for example may be constituted as an engine block sensor (evaluation of motor noise), as a photoconductor in the combustion chamber (optical observation of the chamber), as a pressure sensor (evaluation of the combustion chamber pressure) or as an ion current probe (evaluation of the ionic current in the combustion chamber), supplies its output to an amplifying stage 11, which in turn provides its output to a band pass filter 12 having a mid-band frequency of about 6 kH$_z$. The filter is connected to supply an input to a rectifier circuit 13. The output of this rectifier 13 is processed by an integrator consisting of two integration stages 14 and 15 and then supplied to an analog-to-digital converter 16 the output of which is supplied to a microcomputer 17.

The microcomputer 17 on the one hand controls the amplification factor of the amplifier stage 11 and, on the other hand alternately switches in the two integration stages 14 and 15.

The output of the band pass filter 12 is connected with the microcomputer 17 through a null transition detector 18 constituted, for example as a comparator circuit. In principle, it is possible to substitute a peak value detector in place of the null transition detector 18. Furthermore, angular value information W is supplied to an input 19 of the microcomputer 17, this information being either the signal of a rotation angle transducer or the ignition signal of the engine, in either case a signal indicative of a certain angular position of the crankshaft of the engine. Finally, the engine knock detection or evaluation information is supplied by the microcomputer to its output 20, this information being whether the engine is knocking or not as determined by the microcomputer. This engine knock information is usually supplied to a knock control circuit or unit that affects the ignition timing, the fuel-air mixture composition or other parameters linked with knock reduction.

Figure 2:
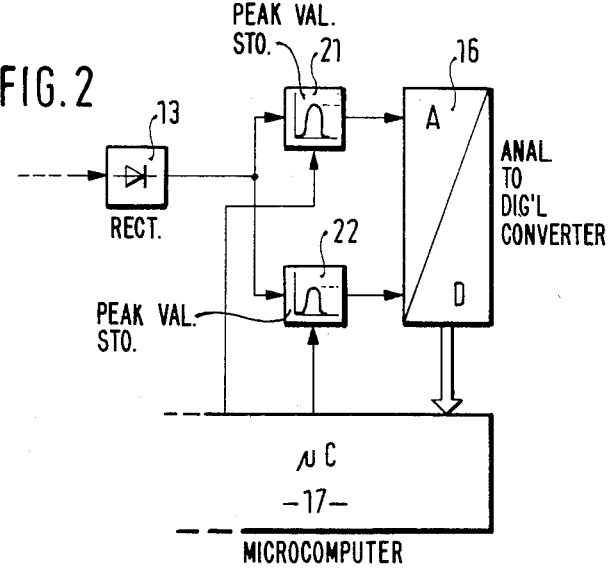
FIG. 2 is a partial block diagram of a second embodiment showing a portion thereof which differs from the embodiment of FIG. 1.

The second embodiment illustrated in FIG. 2 corresponds to a great extent to the first embodiment, so that corresponding component groups are not again represented in FIG. 2, in order to simplify FIG. 2. The only difference consists in that the integration stages 14 and 15 are replaced by peak value stores 21 and 22.

The manner of operation of the embodiments shown in FIGS. 1 and 2 will now be explained with reference to the diagrams given in FIGS. 3 to 6. At the outset, it should be kept in mind that knock producing combustion in an internal combustion engine can be recognized in a variety of ways described in the introduction to the specification. The course of detected sound, light, pressure or ion current in the combustion chamber has a physical characteristic, similar in these various cases, as shown for example in FIG. 3. This typical signal is amplified in the amplifier stage (11). In order to shorten the access and computation time, unimportant information is preferably masked out by the provision of a measurement window M. Only in the range or interval of this measurement window M does an evaluation of sensor or transducer signals take place. The measurement window can be determined either by the sensor signal passing a threshhold value S or by a time interval corresponding to a particular angle of rotation of the crankshaft. The angle information applied to the input (19) of the microcomputer 17 has this significance—it defines the measurement window. If the threshhold method of providing a measurement window is chosen, corresponding information must be obtained from the output signal of the knock sensor (10) by means of a threshhold stage which furnishes an output to the microcomputer 17. In any event, these two methods of limiting signal evaluation to a measurement range or interval are thoroughly described in the prior art disclosures referred to in the introduction of this specification, so that this aspect of the circuits of FIGS. 1 and 2 needs no further description here.

Figure 4:
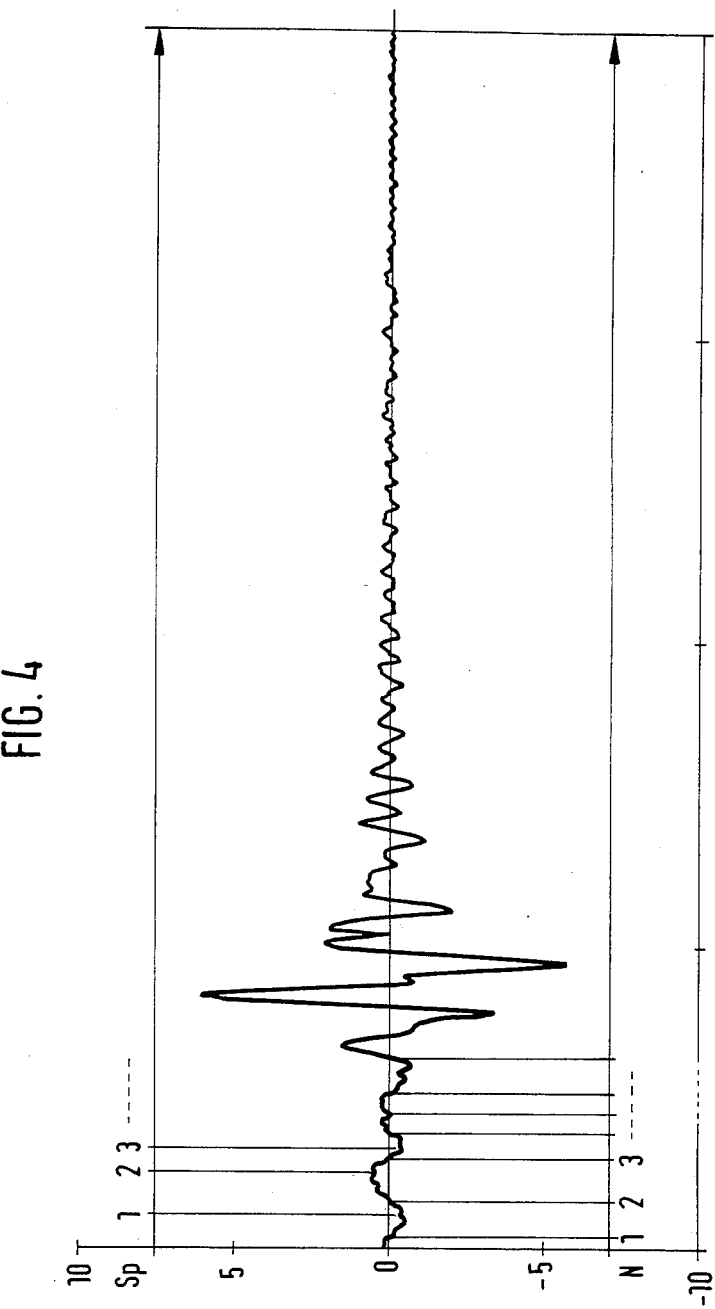
FIG. 4 is a similar graphical representation of a band-filtered engine knock oscillation.

The sensor signal shown in FIG. 3—for example a pressure signal—has oscillations in the trailing portion of the curve which are to be examined to determine whether they are caused by knock-producing combustion. By the filtering produced by the band as filter 12 a signal course according to FIG. 4 is produced which allows these oscillations to be recognized more clearly. These oscillations must then be examined to see whether they can be related to a knock-producing combustion.

For this purpose the null transitions N are first detected by the null transition detector 18 and supplied to the microcomputer 17. As already explained, peak value transitions Sp could alternatively be detected for the same purpose. Between every two successive null transitions, these oscillations, as rectified in the rectifier circuit 13 are subjected to integration under control of the microcomputer 17. The rectified oscillations integrated are the surges of negative half waves. The rectifier output is integrated alternately in the two integration stages 14 and 15 in the case of the circuit of FIG. 1. The integration values obtained are given to the microcomputer 17 through the analog to digital converter 16. This has the advantage that one or other of the integrating stages 14 and 15 performs an integration while the other one is stopped for analog to digital conversion of its last result and is reset before it needs to be used again.

Alternatively, according to the circuit of FIG. 2, the peak values of the oscillation are detected by the peak value stores 21 and 22 and are supplied to the microcomputer as significant function values. In a simpler embodiment, of course only a single such function value formation stage might be provided.

In the case of a typical knock oscillation, these function values (integration value or peak values) correspond to the curve shown in a solid line in FIG. 5 (note also the peak values that can be recognized in FIG. 4). This solid line representing a typical knock is stored as a model or reference function in one of the memories of the microcomputer (17).

Within the measurement window period, the successive function values arriving at the computer are picked up and temporarily stored. By means of these values representing an actual value curve, a comparison can now be made with the model curve to determine whether the deviation of the actual values from the model curve exceeds a prescribed tolerance. This can be done by evaluating the deviation of each observed function value from the model curve or by the equivalent method of having two model curves stored indicating the boundaries of the tolerance region and comparing the observed values with the boundaries. So long as the observed values are within the tolerance region for a prescribed interval of time, a knock signal will be produced. In order to provide a meaningful comparison of the observed values and a tolerance region, a normalizing operation is first carried out. This can be done, for example, by making an adjustment, by a suitable setting of the amplification factor of the amplifier 11 which will bring the measured value M1 corresponding to the greatest amplitude of the signal from which it is derived, to a value substantially equal to the corresponding portion of the model curve. Alternatively, this normalization can be done by multiplying the magnitude scale of the model curve with a factor that varies in accordance with either the first value or the largest value derived from the sensor signal and furnished to the microcomputer. It is also possible to provide the normalization over the sum of all function values, determining the normalization factor by comparison of the sum of the sequence of function values and of the corresponding sequence of reference function values (e.g., comparison of the areas bounded by the respective function curves).

For the evaluation step resulting in the recognition or non-recognition of a knock signal, there are now various possibilities.

By a first method, for all measurement values following the value M1 (FIG. 5), the difference between the measurement value and the model curve is determined and all of these differences are added together. The aggregate difference thus obtained is compared with a predetermined tolerance value and if it is less than the tolerance value, the curve represented by the measured values is deemed to fit the model curve and a signal indicative of the occurrence of a knock-producing combustion is produced. Instead of performing the computing in a microcomputer, it is of course also possible to perform the necessary calculations in separate calculating stages, such as subtraction stages, addition stages and comparison stages.

A second method consists in that each individual difference between a measured value and the corresponding portion of the model curve is compared with a predetermined tolerance value corresponding to that portion of the curve (or to a single predetermined tolerance value) in which case a knocking combustion is recognized only if none of the individual differences exceed the tolerance value.

The third method, which is a modification of the second method, consists in defining a tolerance region or zone extending on both sides of the model curve. This is indicated in FIG. 5 by the broken line. In this case, a knocking combustion is recognized only when all measured values lie in the tolerance zone. The dot-dash line in FIG. 5 is an example of an irregular combustion that does not involve any knocking. Since this curve runs out of the tolerance region, no indication of engine knock is produced in this case. In this manner practically any kind of function defining permissible deviation from a model curve can be utilized as the criterion for recognition of engine knock.

Instead of the comparison of difference values with corresponding values represented on a model function curve, other functions of the difference values could be used in comparison with a corresponding model function. Those heretofore described involve linear functions of the difference values (no power higher than the first power of the variable are used). Other linear functions of the difference values could be used and it is furthermore possible to use non-linear functions, for example, quadratic functions of the different values. Furthermore, it is also possible, to value more weakly the initial region where the highest amplitudes appear, because in that initial region, experience shows that there are greater fluctuations or deviations than in the region corresponding to subsequent measurements. This can be done, for example, by superposing a corresponding damping function as a weight reduction factor, perhaps in a few steps corresponding to an exponential curve. Further improvements can be obtained by taking account of fluctuation of the spacings between null transitions or peak values, in which case the function values determined are correctly related to the correct position on the model curve with respect to the time axis. Putting it the other way, if instead of a model curve, defined by many more points than the number of measurements usually made in a single sequence, there is used as the model, only a sequence of essentially the same number of points, i.e., a set of typical values for successive peak value measurements or integration results for successive half waves, etc., a simpler system or a smaller microcomputer can be used, at only slightly reduced accuracy.

Instead of comparison of the function values derived from the electrical signals of the sensor with corresponding values of a model function curve, the function values derived from the sensor signal can be added together progressively, i.e., every new function value would be added to the value or values previously registered, so that a curve corresponding to that of FIG. 6 would be represented by the progressive sums.

It is noted that still other function values or criteria can be utilized for identification of the significance of the sequence of measured values by reference to a model function. Thus, for example, rates of signal rise, changes in signal slope, etc. may likewise be used for identification of engine knock by comparison with a set of reference data. What is essential for the invention is that a detected course of oscillation, for example FIG. 3, should compared with a model or reference function in some significant way or other and that in the case of agreement of the function values, relating to the oscillations to which the sensor responds, with the reference function within a prescribed tolerance, an indication of knocking combustion in the engine should be provided.

The storing of the number of null transitions or peak values exceeding a particular threshhold can provide useful supplementary information for assuring correct recognition of knocking combustion in the engine. Measurements have shown that knocking combustion produces a certain minimum number of integration values or peak values (in the respective circuits of FIGS. 1 and 2) which are greater than a prescribed minimum integration or peak value. If less than this number of such event is found in an observed sequence, that is an indicatin that no knocking combustion is taking place. For this purpose, the number of integration or peak values exceeding the threshhold value is counted and stored during the time interval of a measurement window and if the prescribed minimum number is not reached, the output (20) of the microcomputer (17) is blocked so that no engine knock indication will be produced. On the other hand, where it is important to keep the knock detection equipment particularly simple, this supplementary precaution can be dispensed with.

The time between two successive null transtions can also be used as supplementary information for recognition of knocking combustion. The frequency corresponding to the period measured by the interval between null transitions is in that case compared with a predetermined frequency band that is typical for knocking combustion in the engine, and unless that frequency lies within that band, the originator of a knock signal will be inhibited.

Although the invention has been described by reference to particular illustrative examples, it should be understood that variations and modifications are possible within the inventive concept.

The various types of systems referred to in the specification, utilizing different types of sensors, different types of function signal formation, different types of reference curves, and the types of deviation or tolerance criterion, etc. are all believed to be useful. The choice between them is likely to turn on considerations of expense that will change from time to time. At the present time, the preferred mode for practice of the invention is operation in accordance with FIGS. 3, 4 and 5, with function signals produced by integration, and with a knock signal indication being produced only when all of these function signals fall within the broken line boundaries of FIG. 5.

We claim:

1. Method of recognizing engine-knock in an internal combustion engine by analysis of electrical signals of a sensor responsive to oscillatory phenomena originating in the combustion chamber of at least one engine cylinder, comprising the steps of:
   amplifying said electrical signals;
   band-pass-filtering said electrical signals;
   deriving from said electrical signals a sequence of function values respectively relating to successive intervals, each of a duration not exceeding a single cycle period of oscillation of said electrical signals each function value of said sequence corresponding to a single oscillation cycle;
   comparing said sequence of function values with a reference sequence of reference values, in which sequence successive reference values differ from each other, each of said reference values being used for comparison with only one of said function values and
   producing a knock-recognition signal when said sequence of function values does not differ by more than a predetermined difference from said reference sequence of reference function values.

2. Method according to claim 1, in which said function values derived from said electrical signals are obtained by integration between null transitions of said electrical signals, one of said function values being obtained for each integration between two successive null transitions.

3. Method according to claim 1, in which said function values derived from said electrical signals are obtained by integration between maxima of said electrical signals, one of said function values being obtained for each integration between two successive maxima.

4. Method according to claim 1, in which said function values of individual cycles of said electrical signals are peak values of said electrical signals.

5. Method according to claim 1, in which the step of comparing said sequence of function values with a reference sequence of reference function values is carried out so as to produce a sequence of difference values between corresponding values of the two sequences and in which said step of producing a knock-recognition signal is performed by summing said difference values and comparing the resulting sum value with a predetermined reference sum value.

6. Method according to claim 5, in which the first difference value of said sequence of difference values is reduced by a predetermined factor before being summed with the other difference values of said sequence.

7. Method according to claim 1, in which the step of comparing said sequence of function values with a reference sequence of reference function values is carried out so as to produce a sequence of difference values between corresponding values of the two sequences and in which said step of producing a knock-recognition signal is performed by comparing said successive difference values with a succession of reference difference values and providing a knock-recognition signal only when none of said difference values has exceeded the corresponding reference difference value.

8. Method according to claim 5, in which the step of comparing said sequence of function values with a reference sequence of reference function values is performed by first squaring said function values and comparing them with reference values that are constituted for comparison with squares of function values derived from said electrical signals and thereby producing a sequence of difference signals, and in which said step of producing a knock-recognition signal is performed by summing said difference values and comparing the reulting sum value with a predetermined reference sum value.

9. Method according to claim 7, in which the step of comparing said sequence of function values with a reference sequence of reference function values is performed by first squaring said function values and comparing them with reference values that are constituted for comparison with squares of function values derived from said electrical signals and thereby producing a sequence of difference signals, and in which said step of producing a knock-recognition signal is performed by comparing said successive difference values with a succession of reference difference values and providing a knock-recognition signal only when none of such difference values has exceeded the corresponding reference difference value.

10. Method according to claim 9, in which the first difference value of said sequence of difference values is reduced by a predetermined factor before being summed with the other difference values of said sequence.

11. Method according to claim 1, in which the step of comparing said sequence of function values with a reference sequence of reference function values and then producing a knock-recognition signal are performed by defining a tolerance region embracing said sequence of reference function values and producing a knock-recognition signal when all the function values derived from said electrical signals lie within said tolerance region.

12. Method according to claim 1, in which at least said steps of comparing said sequence of function values with a reference sequence of reference function values and of producing a knock-recognition signal are performed only within a measurement window period related to engine crankshaft rotation.

13. Method according to claim 12, in which said measurement window period is fixed with reference to a signal derived from an ignition system.

14. Method according to claim 1, in which at least said steps of comparing said sequence of function values with a reference sequence of reference function values and producing knock-recognition signal are performed only during an interval following an occasion when said electrical signal has exceeded a predetermined threshhold magnitude.

15. Method according to claim 1, in which there is also performed the step of applying a normalizizing factor derived from said electrical signals generally affecting the ratio of said function values to said reference function values before comparing said sequence of function values with said reference sequence of reference function values, said normalizing factor being produced so as to correspond to the magnitude of the largest amplitude value of said electrical signals from which said sequence of function values is derived.

16. Method according to claim 1, in which the step is performed of applying a normalizing factor derived from the magnitude of the sum of said sequence of function values derived from said electrical signals to modify the results of comparing said sequence of function values with a reference sequence of reference function values before the step of producing a knock-recognition signal is performed.

17. Method according to claim 1, in which the step is also performed of summing all the individual results of comparing said sequence of function values with a reference sequence of reference function values which indicate a difference between compared values that exceed a predetermined threshhold magnitude and comparing the sum thereby obtained with a predetermined sum magnitude and in which said step of producing a knock-recognition signal is not performed unless the sum of said differences exceeding said threshhold value exceeds said predetermined sum magnitude.

18. Method according to claim 1, in which the additional step is performed of comparing the frequency of the null transitions of said electrical signals with a predetermined frequency band and said step of producing a knock-recognition signal is not performed unless said frequency lies within said frequency band.

19. Method according to claim 1, in which the additional step is performed of comparing the frequency of peak values of said electrical signals with a predetermined frequency band and in which the step of producing a knock-recognition signal is not performed unless said frequency lies within said frequency band.

20. Apparatus for detecting engine knock in an internal combustion engine comprising:
a sensor responsive to rapid combustion effects, including audio-frequency frequency oscillations therein, produced in a cylinder of an internal combustion engine in an interval of time which includes the beginning of combustion in said cylinder for producing electrical signals therefrom;
means for band-pass filtering said electrical signals to produce filtered electrical signals;
means for rectifying said filtered signals to produce rectified oscillation signals;
means for deriving a succession of function value signals from said rectified oscillation signals during respective intervals of a succession of intervals timed by said oscillations, each of said intervals having a duration not exceeding a single oscillation cycle;
means for converting said function value signals of said sequence into digital form;
means including a microcomputer for comparing said succession of function value signals with a reference succession of stored reference function value signals, for evaluating the magnitude of the difference between said succession of function value signals and said reference succession of stored reference function value signals, and for providing or not providing an indication of engine knock on the basis of the evaluation of said difference.

21. Apparatus according to claim 20, in which said means for deriving a succession of function value signals from said rectified oscillation signals is constituted as means for integrating said rectified oscillation signals during said respective intervals of said succession of intervals timed by said oscillations.

22. Apparatus according to claim 21, in which said means for integrating said rectified oscillation signals are constituted of two individual stages controlled by said mircocomputer for deriving, in alteration, successive function value signals of said succession each relating to a different half-cycle of said oscillations.

23. Apparatus according to claim 20, in which said means for deriving a succession of function value signals from said rectified oscillation signals is constituted as means for registering the peak value of said rectified oscillation signals during said respective intervals of a succession of intervals timed by said oscillations.

24. Apparatus according to claim 23, in which said means for registering the peak value of said rectified oscillation signals is constituted of two individual peak value registering stages controlled by said microcomputer for deriving, in alternation, successive function value signals of said succession each relating to a different half-cycle of said oscillations.

25. Apparatus according to claim 20, in which amlifying means of variable amplification factor are interposed in circuit between said sensor and said band-pass filtering means, and in which said microcomputer is equipped for and constituted for varying said amplification factor of said amplifying means in a manner making said succession of function value signals more significantly comparable in magnitude with said reference succession of stored reference value signals.

26. Apparatus according to claim 20, in which a null transition detector (18) is connected between an input of said microcomputer and the output of said band-pass filtering means and said microcomputer is equipped and constituted for comparing intervals between null transitions with a reference range for the value of said intervals, for blocking the provision of an indication of engine knock in the event intervals between successive null transitions fall outside of said reference range.

27. Apparatus according to claim 20, in which a peak value time detector is interposed between the output of said band-pass filtering means and an input of said microcomputer and in which said microcomputer is equipped and constituted for comparing the intervals between peak value times detected by said detector with a range of reference interval values, for blocking the provision of an indication of engine knock when said intervals between detected peak value times do not lie within said range.

* * * * *